(12) United States Patent
Richardson et al.

(10) Patent No.: US 9,228,635 B2
(45) Date of Patent: Jan. 5, 2016

(54) APPARATUS AND SYSTEM FOR RETAINING AND INSTALLING RIVETS

(75) Inventors: Thomas Willoughby Richardson, Hinsdale, IL (US); Robert Richard Jennings, Homer Glen, IL (US)

(73) Assignee: Conveyor Accessories, Inc., Burr Ridge, IL (US)

( * ) Notice: Subject to any disclaimer, the term of this patent is extended or adjusted under 35 U.S.C. 154(b) by 923 days.

(21) Appl. No.: 13/458,102

(22) Filed: Apr. 27, 2012

(65) Prior Publication Data

US 2012/0227231 A1   Sep. 13, 2012

Related U.S. Application Data

(62) Division of application No. 13/045,213, filed on Mar. 10, 2011, now Pat. No. 8,403,139.

(51) Int. Cl.
*B23P 11/00* (2006.01)
*F16G 3/16* (2006.01)
*F16G 3/00* (2006.01)
*F16G 3/04* (2006.01)

(52) U.S. Cl.
CPC *F16G 3/16* (2013.01); *F16G 3/003* (2013.01); *F16G 3/04* (2013.01); *Y10T 29/5377* (2015.01); *Y10T 29/53713* (2015.01)

(58) Field of Classification Search
CPC ............. F16G 3/003; F16G 3/04; F16G 3/16; Y10T 29/5377; Y10T 29/53713
USPC ............ 29/243.521, 243.51, 798, 524.1, 464, 29/229; 206/338; 227/135–137, 119
See application file for complete search history.

(56) References Cited

U.S. PATENT DOCUMENTS

| | | | |
|---|---|---|---|
| 4,688,711 A * | 8/1987 | Gladding et al. | 227/147 |
| 7,493,682 B2 | 2/2009 | Richardson et al. | |
| 7,654,389 B2 | 2/2010 | Vogrig et al. | |
| 8,082,646 B2 | 12/2011 | Richardson et al. | |
| 8,403,139 B2 | 3/2013 | Richardson et al. | |
| 2009/0223023 A1 * | 9/2009 | Daniels et al. | 24/38 |

* cited by examiner

*Primary Examiner* — Anthony Stashick
*Assistant Examiner* — James M Van Buskirk
(74) *Attorney, Agent, or Firm* — Seyfarth Shaw LLP

(57) ABSTRACT

An apparatus and system for retaining and installing rivets into a belt fastener includes a collated rivet strip comprising connected upper and lower strips and retaining a predetermined configuration of rivet heads therebetween. The rivet strip is used in conjunction with a guide block assembly having top and bottom portions interlocked together. The top portion contains studs aligning with the rivet heads to assist the release of the rivet head from the rivet strip, seating the rivets in pilot holes of the lower portion of the guide block assembly for further driving through the belt fastener and into the belt material.

6 Claims, 5 Drawing Sheets

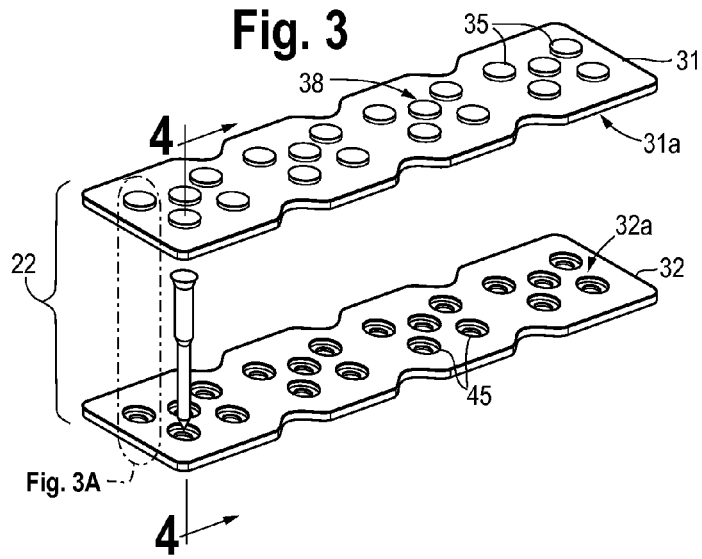
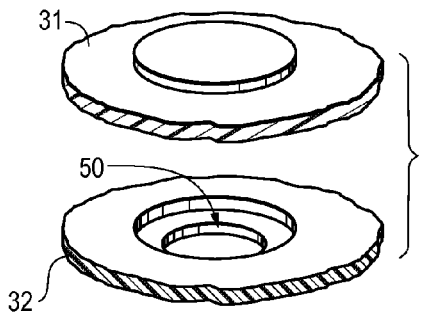
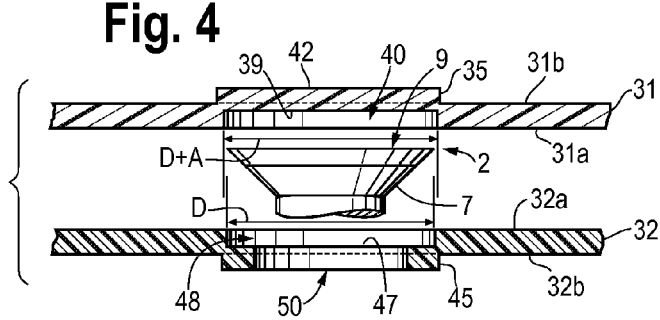
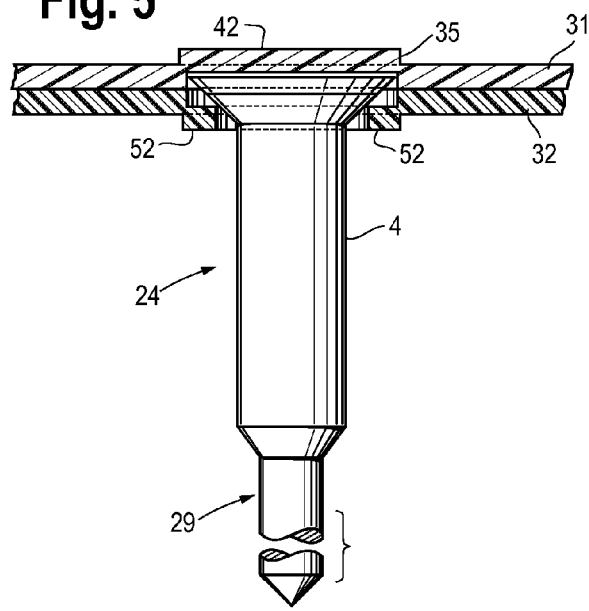

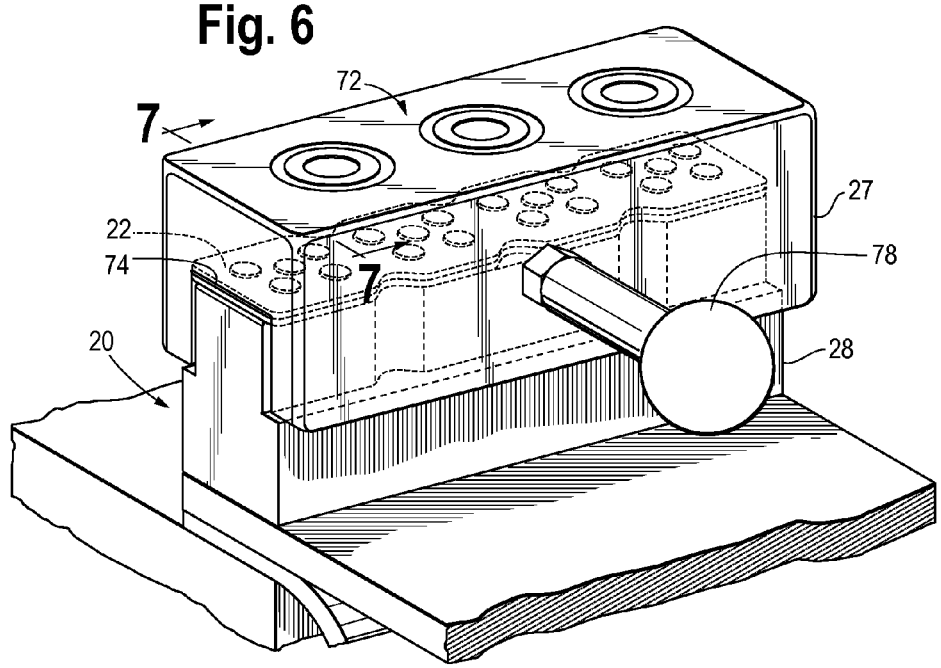
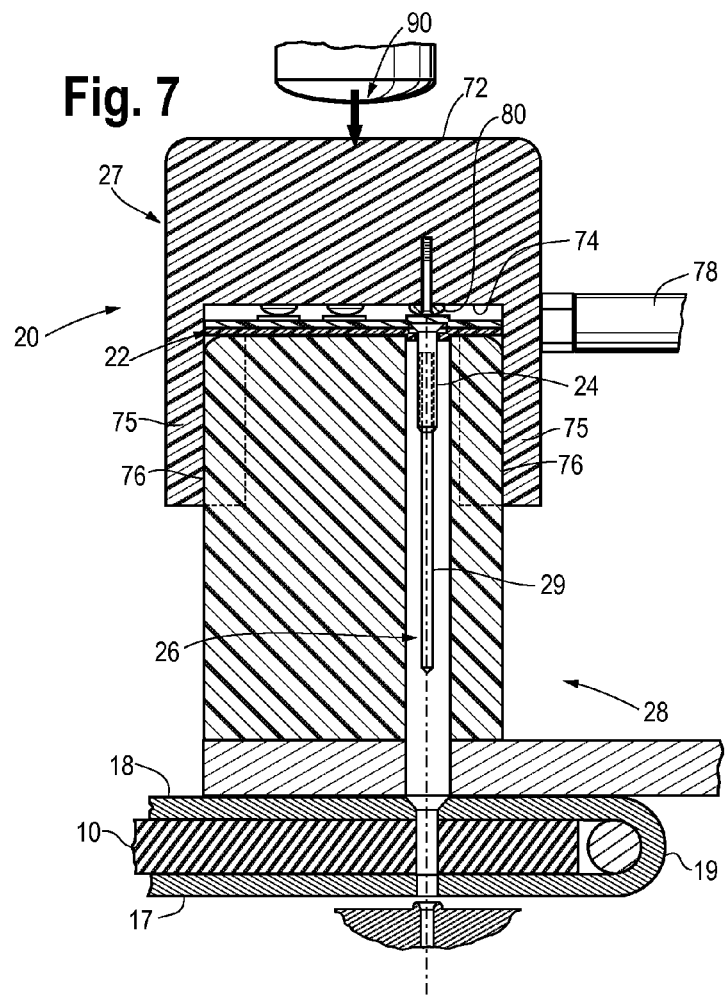

APPARATUS AND SYSTEM FOR RETAINING AND INSTALLING RIVETS

CROSS REFERENCE TO RELATED APPLICATION

This application is a divisional of U.S. patent application Ser. No. 13/045,213, filed Mar. 10, 2011 now U.S. Pat. No. 8,403,139.

FIELD OF THE INVENTION

The invention relates to installing rivets in belt fasteners and, in particular, to a collated rivet strip and system for installing rivets retained in a collated rivet strip in belt fasteners for conveyor belts.

BACKGROUND

A belt fastener generally includes an upper plate overlying one side of the belt end and a lower plate underlying the other side of the belt end. The upper plate contains apertures aligning with corresponding apertures in the lower plate located on the opposing side of the belt. The belt fasteners are connected to the belt ends with rivets having a head secured against the upper plate of the belt fastener, a shank passing through an aperture in the upper plate and the belt material, and a swage end passing through the corresponding aperture in the lower plate of the belt fastener and deformed around the aperture.

Optimal belt performance is related to proper connection between the belt ends, and, therefore, is related to a proper connection between the belt fasteners with the belt end. Alignment of the rivets with the corresponding apertures on the upper and lower plates of the belt fastener is critical to ensuring a proper connection of the belt fastener to the belt end. One manner known for aligning the rivets prior to and during driving of the rivets is to utilize a guide assembly containing a guide block. Applicants have developed such assemblies, as shown in U.S. Pat. No. 7,493,682, as well as divisional application Ser. Nos. 12/348,227, and 12/348,229, each of which are incorporated by reference as if reproduced in their entirety herein.

As known in the prior art, the guide block contains a plurality of pilot holes. The pilot holes are arranged to correspond to a predetermined arrangement of apertures in the belt fasteners. The guide block is placed over the belt fasteners in a manner aligning the pilot holes with the belt fastener apertures. A single rivet assembly, which includes the rivet and a detachably connected pilot nail, is loaded into a pilot hole, properly aligning the rivet assembly with the belt fastener aperture prior to and during installation. Each rivet assembly may be loaded individually into a pilot hole, a process taking a considerable amount of time. For example, a standard 48" belt splice may require approximately 270 rivet assemblies, thus requiring more time to load the pilot holes with rivet assemblies than to actually drive the rivets into the belt end.

In order to facilitate the loading of rivet assemblies into the pilot holes of a guide block, several apparatuses have been developed that hold a plurality of rivet assemblies in a predetermined configuration corresponding to the pilot holes. The prior rivet holders were made of a molded, rigid plastic which contain a number of openings. Rivets were inserted into the mold prior to injection of the plastic material into the mold that formed the rivet holders. The complexity of the mold makes such a process expensive to manufacture. Further, different rivet sizes and compositions required different molds in order to identify the rivets retained in the strip, and further adding to the already expensive manufacturing process.

Additionally, in prior rivet holders, a frangible portion of plastic material may be located on the underside of the rivet head to retain the rivet head within the rivet holder before the rivet head is released from the rivet holder. When force is applied to drive the rivet, the frangible portion of plastic breaks off from the rivet holder, permitting the rivet head to pass freely into the pilot hole of the guide block. The frangible portion may often enter the pilot hole of the guide block prior to the rivet head passing through the pilot hole. Each pilot hole is generally tapered inwardly and only slightly larger than the diameter of the rivet head, configured as such to prevent lateral movement of the rivet during driving. The debris created due to released frangible portions of plastic material in the pilot holes of the guide block can, among other things, restrict the rivet from freely passing through the pilot hole during installation or cause the rivet to seat improperly.

The rivet head is fully retained and concealed within the plastic material after the mold has been filled. This plastic material used in prior molded rivet holders obstructs viewing of the top of the rivet head. A drive head portion of the strip may be molded above the rivet head to facilitate the release of the rivet from the strip when a driving force is applied. The drive head prevents proper identification of the variable length and metal composition characteristics of the individual rivet assemblies because the common method for rivet manufacturers to identify the rivets is to stamp such characteristics on the top of the rivet head. Additionally, drive heads that have been struck by the driving force release from the strip, creating additional build-up of plastic debris during installation.

Because of issues attendant the use of prior rivet holding apparatuses, there has been a need for an improved apparatus for loading rivet assemblies into a guide block prior to installing the rivets into a belt fastener for conveyor belts.

SUMMARY

In accordance with an aspect, a collated rivet strip for retaining a plurality of rivets is disclosed. The collated rivet strip comprises a rivet-driving strip and a rivet-aligning strip, wherein a first surface of the rivet-aligning strip is connected to a second surface of the rivet-driving strip, a rivet head of at least one rivet being retained between the rivet-driving and rivet-aligning strips.

The collated rivet strip may include a plurality of buttons disposed on the rivet-driving strip, and a plurality of dimples disposed on the rivet-aligning strip, wherein each dimple contains a hole for insertion of the rivet therethrough and the plurality of buttons are located corresponding to the plurality of dimples.

A portion of the dimple may be detachable from the rivet-aligning strip. Further, the detached portion of the dimple may create a guide washer. Additionally, the outer circumference of the dimple may be perforated to assist the release of the dimple from the rivet-aligning strip.

In operation, the buttons may be retained within the rivet strip after the rivet head is driven through the rivet-aligning strip. The diameter of the button head may be less than the diameter of the button underside, the diameter of the button underside being larger than a diameter of the dimple to prevent the button from passing through the rivet-aligning strip.

In alternative embodiments, the upper and lower strips are connected by sonic welding, heat welding, and are composed of a substantially clear polypropylene.

In another aspect, a guide block assembly for alignment of the rivet assembly with the belt fastener apertures is disclosed, the guide block assembly having interlocking top and bottom portions, the bottom portion containing a plurality of pilot holes, and the top portion containing a plurality of studs corresponding to and aligning with the pilot holes. The guide block assembly is adapted for use in conjunction with a rivet delivery strip retaining a plurality of rivets corresponding to the plurality of pilot holes, the rivet delivery strip comprising an rivet-driving and rivet-aligning strip and retaining a head of each rivet therebetween. Illustratively, the guide block is a rigid, polyethylene material.

The top portion of the guide block may contain flanges abutting sides of the bottom portion, the flanges containing at least one interlocking groove or channel aligning with a corresponding groove or channel on the sides of the bottom portion for retaining the top and bottom portions in relative alignment prior to and during driving.

BRIEF DESCRIPTION OF THE DRAWINGS

Embodiments will be described with reference to the following drawing figures, in which like numerals represent like items throughout the figures, and in which:

FIG. 3 is an exploded view of a collated rivet strip.

FIG. 3A is an exploded view of a button and dimple of a collated rivet strip.

FIG. 4 is a cross-sectional view of the upper and lower rivet strips prior to assembly of the strips.

FIG. 5 is a cross-sectional view of the upper and lower rivet strips after assembly of the strips.

FIG. 6 is a perspective view of a guide block and top.

FIG. 7 is a cross-sectional view of a guide block and top.

DETAILED DESCRIPTION

Figure 1:
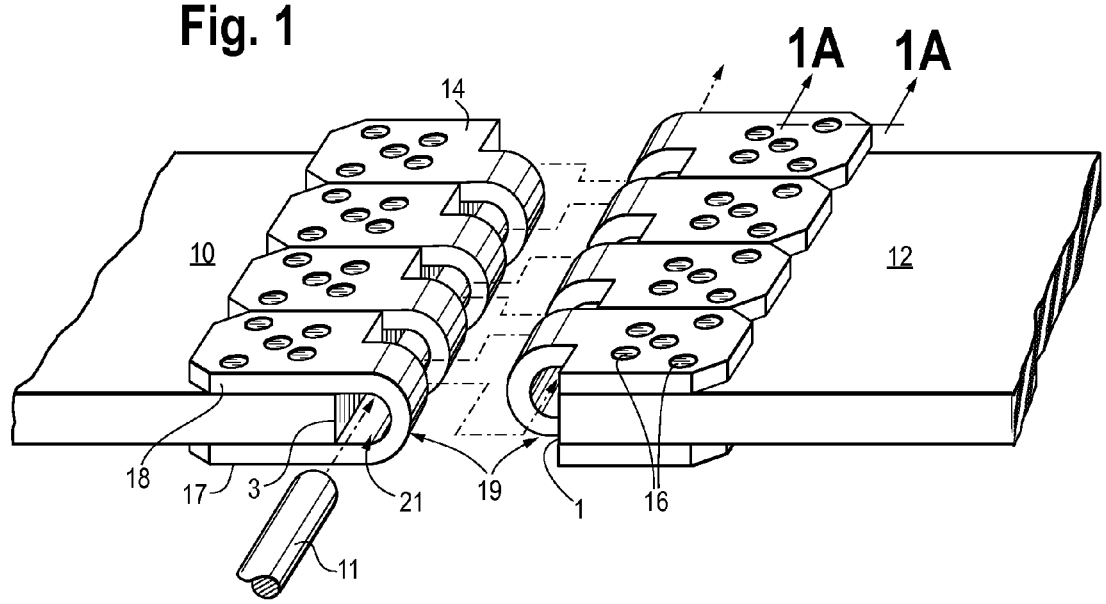
FIG. 1 is a perspective view of belt fasteners and belt ends prior to assembly of the two belt ends.
Figure 1A:
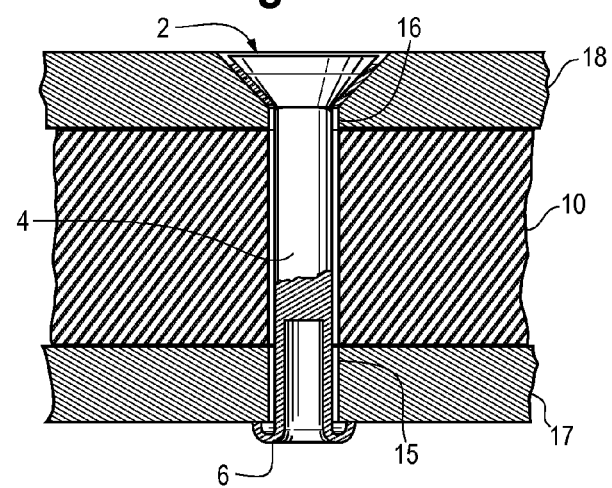
FIG. 1A is a cross-sectional view of a rivet installed through a belt fastener and belt material.

Referring initially to FIGS. 1 and 1A, two ends 1 and 3 of a conveyor belt 10 are shown prior to assembly of a belt splice. A plurality of belt fasteners 14 include an upper plate 18 overlying one side of the belt end 1 and a lower plate 17 underlying the other side of the belt end 1. A corresponding number of belt fasteners 14 overlie and underlie the second belt end 3. The upper plate 18 contains apertures 16 aligning with corresponding apertures 15 in the lower plate located on the opposing side of the belt. The belt fasteners 14 are connected to the belt ends 10 and 12 with rivets 24 having a head 2 secured against the upper plate 18 of the belt fastener 14, a shank 4 passing through an aperture 16 in the upper plate 18 and the belt material 10, and a swage end 6 passing through the corresponding aperture 15 in the lower 17 plate of the belt fastener 14 and deformed around the aperture 15.

The belt fasteners 14 contain a U-shaped curved portion 19 connecting the upper plate 18 and lower plate 17 around the ends 1 and 3 of the belt 10. The curved portion 19 and the belt end 3 form a channel 21 therethrough. The curved portion 19 of the belt fasteners 14 on one belt end 1 are then aligned with the curved portion 19 of the belt fasteners 14 on the other belt end 3, forming a continuous channel 21 along the width of the belt 10. Once the curved portions 19 are aligned between the opposing belt ends 1 and 3, a rod 11 is inserted through the channel 21 to secure in a hinge-like fashion the belt fasteners 14 and belt ends 1 and 3.

Figure 2:
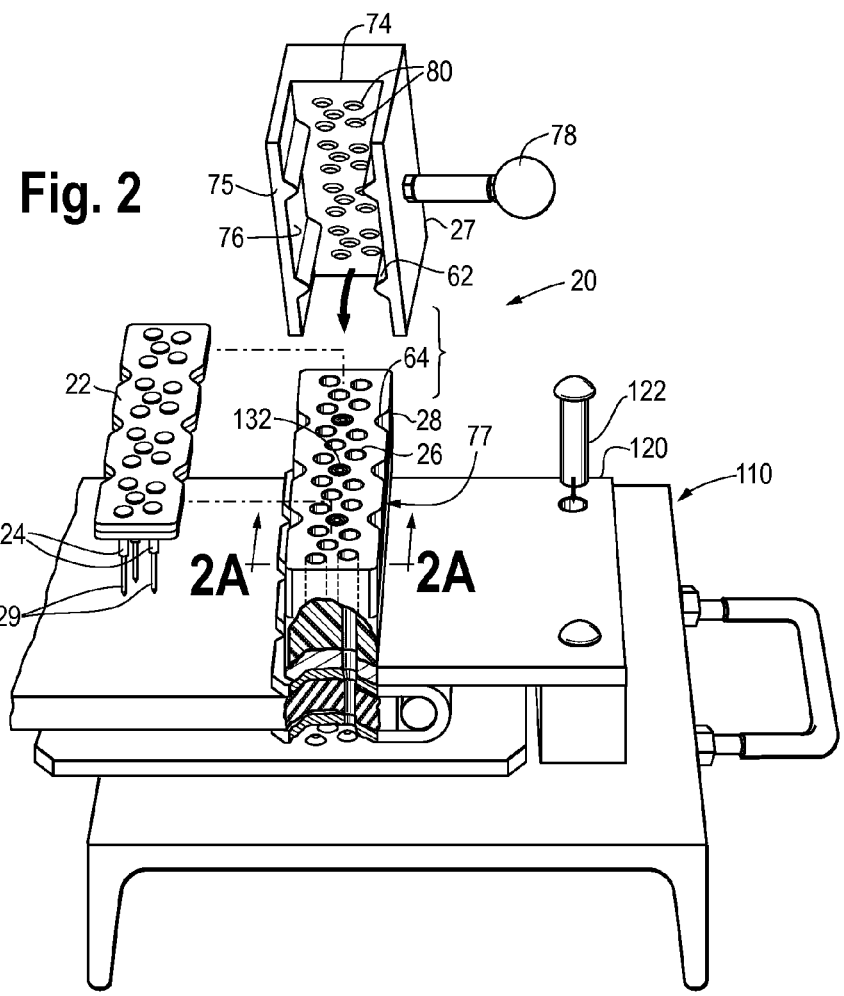
FIG. 2 is a perspective view of the assembly as an embodiment of the present invention.

Referring to FIG. 2, a guide block assembly 20 of the present invention, for installing belt fasteners 14 as illustrated in FIGS. 1 and 1A, is shown with a collated rivet strip 22 retaining rivets 24 and a plurality of pilot holes 26 in the bottom portion 28 of the guide block assembly 20. When in use, the guide block assembly 20 is positioned to align the pilot holes 26 and rivets 24 with corresponding belt fastener apertures 15 and 16, the belt fastener 14 being positioned around an end 1 of the conveyor belt 10 for securing with a second belt end 3 to form a belt splice or connection. The configuration of pilot holes 26 in the guide block 20 corresponds to the configuration of belt fastener apertures 15 and 16. Guide block pilot hole 16 arrangements can be modified to correspond to different belt fastener aperture configurations.

Figure 2A:
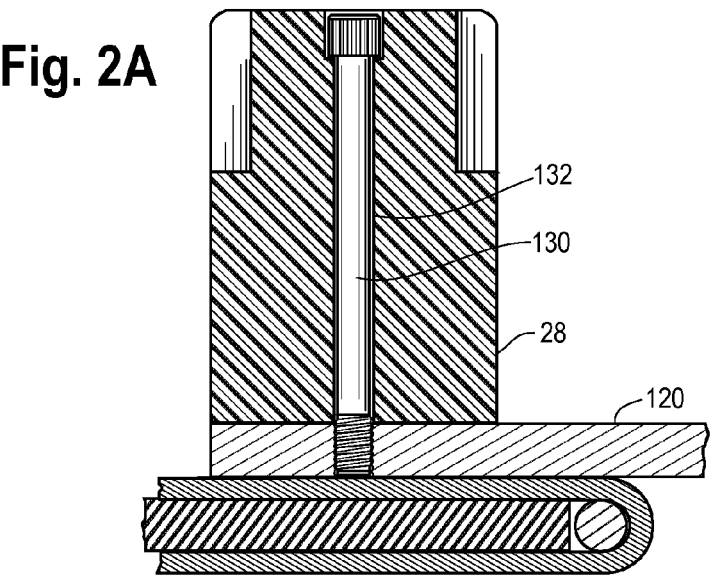
FIG. 2A is a cross-sectional view of a guide block depicting a guide pin.

The guide block 28, belt fasteners 14, and belt 10 are retained in relative alignment during installation by a mounting assembly 110. Such mounting assemblies have been described by Applicants in U.S. Pat. No. 7,493,682, as well as divisional application Ser. Nos. 12/348,227, and 12/348,229, each of which are incorporated by reference as if reproduced in their entirety herein. As such, the guide block 28 may cooperate with a guide plate 120, the guide plate 120 being located on the mounting assembly 110 by a guide pin 122. The guide block 28 and guide plate 120 are secured together via removable fasteners such as screws 130 (FIG. 2A). As can be seen best in FIGS. 2 and 2A, the guide block 28 has a series of holes therethrough. As shown, three holes 132 are provided for the screws 130 to pass through for securing the guide block 28 to the guide plate 120.

The collated rivet strip 22 is comprised of two individual strips. An upper strip or rivet-driving strip 31 is disposed above the rivet head 2 and drives the rivet 24. A lower strip or rivet-aligning strip 32 is disposed below the rivet head 2 and aligns the rivet 24. The lower surface 31a of the upper strip 31 and the upper surface 32a of the lower strip 32 abut one another when assembled. In an illustrative embodiment, the upper and lower strips 31 and 32 are composed of a clear polypropylene material. The clear plastic material permits visual identification of the rivet's metal composition and size stamped on the rivet head 2 even while the rivet head 2 is retained between the upper and lower strips 31 and 32. The lower strip 32 may also be color-coded to further assist in identifying the characteristics of rivets 24 retained in the rivet strip 22.

The upper and lower strips 31 and 32 may be securely connected by sonic welding, heat welding, or equivalents thereof. When the rivets 24 are loaded and the upper and lower strips 31 and 32 are assembled as depicted in FIG. 5, the upper and lower strips 31 and 32 retain the rivet head 2, as will be discussed in further detail below.

Referring to FIGS. 3-5, an upper strip 31 of the collated rivet strip 22 is shown. The upper strip 31 contains a plurality of buttons 35 arranged in a predetermined pattern. The buttons 35 may be arranged in the depicted five-rivet, clustered pattern 38, or any other pattern corresponding to the belt fastener apertures 15 and 16 and guide block pilot holes 26 that will be used during installation. As is customary in the field of belt fastener aperture arrangements, each cluster may contain two to eight rivets. Each collated rivet strip 22 may contain one or more clusters 38. The buttons 35 extend from the top surface 31b of the upper strip 31. As can be seen more clearly in FIG. 4, the button 35 is partially hollow, forming a recess 40 on the underside 39 of the button 35 for placement of the rivet head 2 therein.

In one form, the height of the button 35 extending from the top surface 31b of the upper strip 31 to the button head 42 is greater than the combined thickness of the upper and lower strip 31 and 32. This ensures the rivet head 2 will clear the bottom surface 32b of the lower strip 32 when the button head 42 is driven flush with the top surface 31b of the upper strip 31. The button head 42 diameter is slightly smaller than the diameter of the recess 40 abutting the top 9 of the rivet head 2, creating a shear plane allowing the button 35 to shear away from the upper strip 31 when a driving force is applied.

Figure 8:
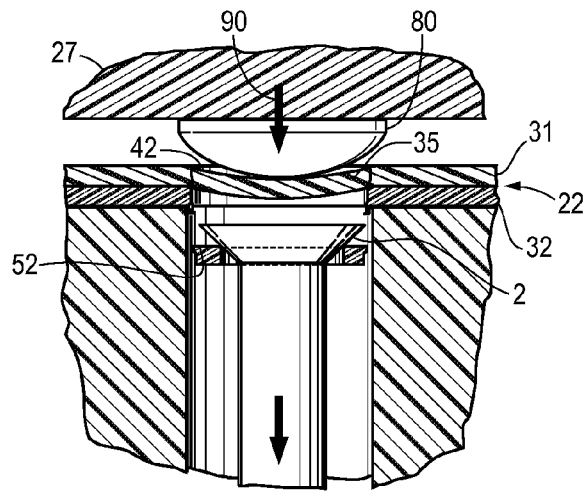
FIG. 8 is a cross-sectional view of a rivet strip during impact of guide block top.
Figure 9:
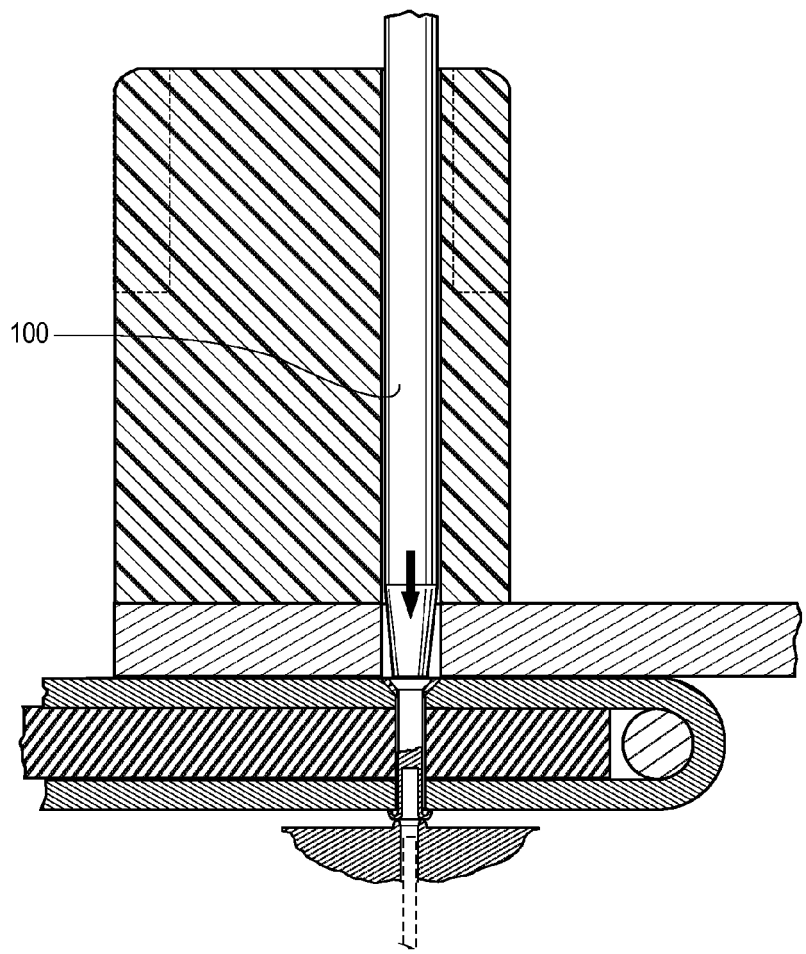
FIG. 9 is cross-sectional view of a prior art tool installing the rivets in the belt fastener and belt material.

As illustrated in FIGS. 3-5, the lower strip 32 of the collated rivet strip 22 contains a plurality of dimples 45 arranged in a predetermined pattern corresponding to the arrangement of buttons 35 on the upper strip 31. The dimples 45 extend from the bottom surface 32b of the lower strip 32, the interior of the dimple 45 being partially hollow and forming a corresponding recess 48 on the upper side 47 of the dimple 45. Each dimple 45 contains a centrally located aperture 50 for insertion of the rivet shank 4 therethrough. The dimple 45 underlies the underside 7 of the rivet head 2. In one form, the depth of the recess 48 is slightly less than the depth of the lower strip 32 to permit the portion 52 of the dimple underlying the underside 7 of the rivet head 2 to shear off when the rivet head 2 is driven. Additionally, the circumference of the recess may contain perforations to facilitate shearing. As depicted in FIG. 8, the dimple 45 acts as a guide washer 52 once sheared from the lower strip 32 and guides the rivet head 2 through the guide block 28 during driving, as well as retains the underside 7 of the rivet head 2 firmly against the upper plate 18 of a belt fastener 14 when fully secured in the belt 10. The diameter of the recess 48 of the dimple 45 is less than the diameter of the recess 40 of the button 35. As such, the hole left in the lower strip 32 after the rivet head 2 is driven will retain the button 35, preventing the button 35 from following the rivet head 2 into the pilot hole 26 of the guide block 28.

In operation, the collated rivet strip 22 is loaded with the proper rivets 24. The upper and lower strips 31 and 32 may be standardized to accommodate more than one rivet size and metal composition, reducing overall manufacturing costs of the strips 22. To load the collated rivet strip 22, the pilot nail 29 and rivet 24 are inserted through the aperture 50 of the dimple 45, the underside 7 of the rivet head 2 resting in the recess 48 of the dimple. The upper strip 31 is placed on top of the lower strip 32 so that the top of the rivet heads 2 are retained in the recesses 40 of the buttons 35. The depth of the rivet head 2 is therefore contained partially within the recess 48 of the dimple 45 in the lower strip 32 and partially within the recess 40 of the button 35 in the upper strip 31. The upper and lower strips 31 and 32 may be sonic welded, heat welded, or any equivalent thereof. Once the upper and lower strips 31 and 32 are loaded and mated together or connected, the rivet strip 22 is ready for use, for example, in fastening a belt fastener to a belt end.

Referring now to FIGS. 2 and 6-9, a loaded rivet strip 22 is inserted into the corresponding pilot holes 26 of an appropriate guide block assembly 20. The guide block assembly 20 is comprised of a lid 27 and block 28 interlocked together and being retained in position relative one another via corresponding channels 62 and grooves 64, or other corresponding interlocking structures. The lid 27 and block 28 may be made from a ultra-high molecular weight polyethylene which is rigid and resistant to wear. The block 28 contains a plurality of pilot holes 26 for insertion of the pilot nails 29 and rivets 24 therein. The configuration of pilot holes 26 in the block corresponds to the configuration of belt fastener apertures 15 and 16. Block pilot hole arrangements can be modified to correspond to different belt fastener aperture configurations.

The lid 27 comprises a top 72, bottom 74, and two flanges 75 and 75, forming a U-shaped cross-sectional configuration. The inner walls 76 of the flanges 75 abut the sides 77 of the block 28. The flanges 75 may contain grooves 62 or channels 64 corresponding to interlocking structures 62 or 64 on the sides 77 of the block 28 to secure the lid 27 and block 28 relative one another prior to and during driving. In an embodiment, the flanges 75 may also include a handle 78 extending from a side of the lid 27. A user may grasp the handle 78 during driving to protect the user's hand from injury by, and to better control, the driving device used to release the rivet head 2 and guide washer 52 from the rivet strip 22. On the bottom 74 of the lid 27 is a plurality of studs 80. The configuration of studs 80 extending from the bottom 74 corresponds to the configuration of the pilot holes 26 in the block 28.

In operation, as depicted in FIGS. 7 and 8, an assembled rivet strip 22 is seated upon the block 28, the pilot holes 26 receiving the pilot nails 29 and rivets 24 retained by the rivet strip 22. The lower surface 32b of the rivet strip 22 lies flush against the block 28, eliminating rattling and shifting during driving. The lid 27 is seated upon the upper surface 31b of the rivet strip 22, the flanges 75 of the lid abutting the sides 77 of the block 28 and interlocking or securing the lid 27 and block 28 to prevent shifting when a driving force is applied. The studs 80 on the bottom 74 of the lid 27 align and contact the button head 42. Once the lid 27, block 28 and rivet strip 22 are properly seated and aligned over the corresponding belt fastener apertures 15 and 16, a driving force (depicted in the Figures as a downward arrow and identified by reference number 90) via a hammer or other pneumatic, electric or manual driver, is applied to the top 72 of the lid 27. As illustrated in FIG. 8, the driving force 90 applies force through the stud 80 which contacts the button head 42. The stud 80 drives the button 35, releasing the rivet head 2 and guide washer 52 from the rivet strip 22. The button 35 is retained in a portion of the lower strip 32 due to the smaller diameter of the dimple 45 compared to the button 35. The rivets 24 and pilot nails 29 remain seated in the pilot holes 26 of the block 28. After removing the lid 27 and the remaining portion of the rivet strip 22, a device 100 drives the rivets 24 through the belt fasteners 14 and belt material 10 to complete the installation of the rivets 24. Applicants have developed such devices, as shown in U.S. Pat. No. 7,493,682, as well as divisional application Ser. Nos. 12/348,227, and 12/348,229, each of which are incorporated by reference as if reproduced in their entirety herein.

While the invention has been described with respect to specific examples including presently preferred modes of carrying out the invention, those skilled in the art will appreciate that there are numerous variations and permutations of the above described systems and techniques that fall within the spirit and scope of the invention as set forth in the appended claims.

What is claimed is:

1. A system for inserting work pieces having respective work piece heads, comprising:
 a guide block having a top portion coupled to a bottom portion, the bottom portion including pilot holes and the top portion including a plurality of studs respectively corresponding to and aligning with the pilot holes and extending from a bottom of the top portion towards the bottom portion; and a delivery strip adapted to retain the work pieces respectively corresponding to the pilot holes, the delivery strip including upper and lower strips and retaining a head of the work piece heads therebetween.

2. The system according to claim 1, wherein the upper strip includes buttons, and the lower strip includes dimples respectively corresponding to the buttons, wherein each dimple includes a dimple hole adapted to receive one of the work pieces.

3. The system according to claim 2, wherein the guide block is comprised of polyethylene.

4. The system according to claim 3, wherein the top portion of the guide block includes flanges abutting sides of the bottom portion, the flanges including an interlocking groove aligning with a corresponding channel disposed on the sides of the bottom portion for retaining the top and bottom portions in relative alignment.

5. The system according to claim 1, further comprising a lid adapted to receive a driving force on an upper lid side and apply the driving force to the work pieces on a lower lid side, the lid including a lid stud disposed on the lower lid side and adapted to contact at least one of the heads of the work pieces.

6. The system of claim 5, wherein the lid further includes a flange disposed on a side of the lid and adapted to abut a side of the guide block and align the lid with the guide block.

* * * * *